(No Model.)

H. S. HALLWOOD.
SCREEN FOR GAS PIPES.

No. 446,218. Patented Feb. 10, 1891.

WITNESSES:
Robsomann A Ferry
Thos S Gates

INVENTOR
Henry S. Hallwood.
BY
C C Shepherd
ATTORNEY.

UNITED STATES PATENT OFFICE.

HENRY S. HALLWOOD, OF COLUMBUS, OHIO.

SCREEN FOR GAS-PIPES.

SPECIFICATION forming part of Letters Patent No. 446,218, dated February 10, 1891.

Application filed August 8, 1890. Serial No. 361,493. (No model.)

*To all whom it may concern:*

Be it known that I, HENRY S. HALLWOOD, a citizen of the United States, residing at Columbus, in the county of Franklin and State of Ohio, have invented a certain new and useful Improvement in Screens for Gas-Pipes, of which the following is a specification.

My invention relates to the improvement of screens for natural-gas pipes; and the objects of the invention are to provide natural-gas pipes with an improved gas screening and deflecting device, by means of which sand, pebbles, gravel, or other foreign matter will be screened from the gas and deflected from the gas-pipe; to provide a collecting-pipe or receiver for said foreign matter which may be readily and easily cleared of the deposits therein; to so construct a screening mechanism as to admit of its removal from the pipes or horizontal adjustment and to construct said device in a simple, durable, and effective manner. These objects I accomplish in the manner illustrated in the accompanying drawings, in which—

Figure 1:
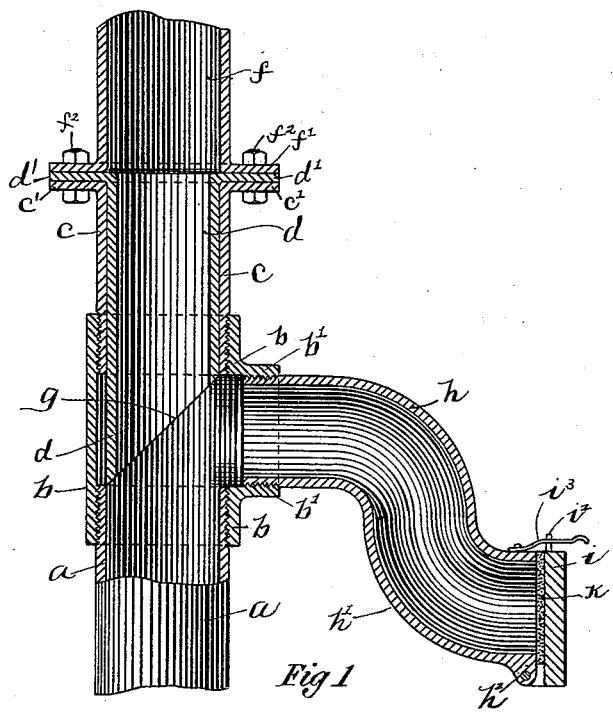
Figure 2:
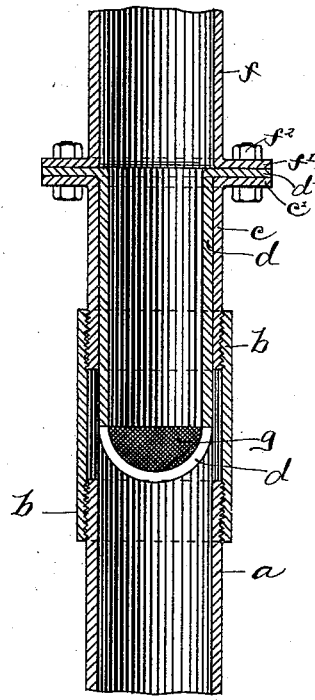
Figure 3:
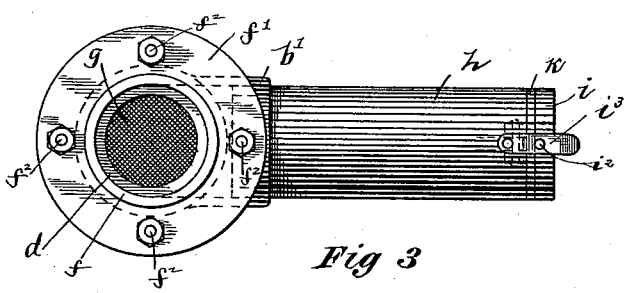

Figure 1 is a central horizontal section of natural-gas piping, showing my improved screening and collecting apparatus connected therewith. Fig. 2 is a sectional view of said gas piping and screening apparatus, taken at right angles with Fig. 1; and Fig. 3 is a plan view.

Similar letters refer to similar parts throughout the several views.

$a$ represents a section of ordinary gas-piping, having its forward end portion screw-threaded, as shown. Upon this forward screw-threaded portion of the pipe $a$ is screwed one end of the head of a T-coupling $b$. Within the opposite forward end of the head is screwed the rear end of a forwardly-extending pipe $c$, the latter having its forward end provided with a circumferential flange $c'$.

The pipes $c$ and $a$ are of the same diameter and are screwed at such distance into the T-head as to bring their ends in line or flush with the inner surface of a laterally-projecting coupling neck or stem $b'$.

$d$ represents a screen-pipe, which, as shown, is of such diameter as to fit snugly within the pipe $c$, within the forward end of which it is inserted. The upper end of the internal pipe $d$ is provided with a circumferential rim or flange $d'$, which, as shown, rests upon the flange $c'$ of the pipe $c$. The lower end of the pipe $d$, as shown in the drawings, is beveled or cut diagonally, the short side of the pipe formed by said cut terminating at or near the inner end of the pipe $c$, while the longer side of the pipe $d$ or outer end of the bevel extends to the inner end of the pipe $a$, thus bringing the inner mouth of the pipe $d$ opposite and into communication with the stem $b'$ of the T-coupling.

The conduit formed by the horizontal gas-piping herein described is continued forwardly by a piping $f$, the first section of which is provided, as shown, with a projecting end flange $f'$, which bears against the flange $d'$ of the pipe $d$. The pipe-flanges $c'$, $d'$, and $f'$ are bolted together by bolts $f^2$, thus clamping the pipe $d$ firmly in place between two pipe-sections. The rear and beveled end of the pipe $d$ is covered by a suitable screen-disk or sort of perforated screening material $g$.

Within the outer end of the T-coupling stem $b'$ is screwed one end of an outwardly-extending screenings-outlet or collecting-pipe $h$. This pipe $h$ is preferably bent approximately at right angles near its central portion to form an elbow $h'$. Said pipe may, however, be straight or otherwise bent, if desired. The outer end of the pipe $h$ is normally closed by a door $i$ or suitable valve, the inner face of which is preferably provided with a suitable lining of rubber or other flexible packing material $k$. This door $i$ has its lower end portion hinged to a suitable projecting lug $h^2$ formed on the pipe $h$. The door $i$ is normally held closed against the open pipe end by a suitable fastening, which may consist, as shown, of an outwardly-projecting pin $i^2$ on the upper side of the door and a spring catch-strip $i^3$, which has its rear and inwardly-bent end fixed to the periphery of the pipe $h$, and has its outwardly-extending portion provided with a central opening to receive therethrough the stem $i^2$. The door may be readily unlatched and let down by elevating the outer end of the spring-strip $i^3$ until it clears the pin $i^2$.

The operation of my gas-screen apparatus is as follows: The gas passing forward through the pipe $a$ passes through the screen $g$, thence through the pipes $d$ and $f$ to the furnace or burners, where it is consumed. Practice has demonstrated that natural gas travels with such force as to carry with it quantities of small stones, sand, dirt, and other foreign matter, which greatly interferes with the utilization of the gas at the burners. This foreign matter, in passing through the pipes, comes into contact with the inclined screen $g$, which being opposite the entrance to the pipe $h$, operates as a deflector for said foreign matter, deflecting the latter from its forward course into the pipe $h$. The matter thus deflected accumulates in the outer end portion of the pipe while the screened gas passes forward through the screen. When desired, the screenings collected within the pipe $h$ may be readily removed therefrom by opening the door $i$. This opening of said door forms an outlet for the screenings which are rapidly driven from the pipe $h$ by the force of the gas.

From the construction herein shown and described it will be seen that in case it should be necessary to remove the screen for repairing or other purposes the pipe-flanges may be disconnected by removing the bolt $f^2$ and the screen-pipe easily withdrawn from its position. It will also be observed that the construction shown provides a straight passage for the gas, and is of a durable, strong, and simple nature.

Having now fully described my invention, what I claim, and desire to secure by Letters Patent, is—

In a screening apparatus for gas-pipes, the combination, with the pipes $c$ and $a$, T-coupling $b$, connecting said pipes, and detachable internal screen-pipe $d$, entering pipe $c$ and projecting within said T-coupling, and an inclined screen $g$, covering the beveled inner end of the screen-pipe, of an outlet-pipe $h$, communicating with the coupling $b$, and a door $i$, adapted to close the outer end of said pipe $h$, substantially as described.

HENRY S. HALLWOOD.

In presence of—
C. C. SHEPHERD,
E. E. BRAGG.